(12) United States Patent
Ogilvie

(10) Patent No.: US 7,712,132 B1
(45) Date of Patent: May 4, 2010

(54) DETECTING SURREPTITIOUS SPYWARE

(76) Inventor: John W. Ogilvie, 1320 E. Laird Ave., Salt Lake City, UT (US) 84105

(*) Notice: Subject to any disclaimer, the term of this patent is extended or adjusted under 35 U.S.C. 154(b) by 1076 days.

(21) Appl. No.: 11/277,453

(22) Filed: Mar. 24, 2006

Related U.S. Application Data

(60) Provisional application No. 60/724,348, filed on Oct. 6, 2005.

(51) Int. Cl.
*G06F 11/00* (2006.01)

(52) U.S. Cl. .............................. 726/22; 726/23; 726/24

(58) Field of Classification Search ............... 726/1, 726/22–26; 713/187–188, 200; 707/100; 705/34
See application file for complete search history.

(56) References Cited

U.S. PATENT DOCUMENTS

| | | | |
|---|---|---|---|
| 6,480,962 B1 | 11/2002 | Touboul | |
| 6,804,780 B1 | 10/2004 | Touboul | |
| 7,010,698 B2 | 3/2006 | Sheymov | |
| 7,065,657 B1 | 6/2006 | Moran | |
| 7,533,416 B2* | 5/2009 | Chawro et al. | 726/25 |
| 2002/0083343 A1 | 6/2002 | Crosbie et al. | |
| 2003/0037138 A1 | 2/2003 | Brown et al. | |
| 2003/0078863 A1* | 4/2003 | Pilu | 705/34 |
| 2004/0030914 A1* | 2/2004 | Kelley et al. | 713/200 |
| 2004/0064736 A1 | 4/2004 | Obrecht et al. | |
| 2004/0078592 A1 | 4/2004 | Fagone et al. | |
| 2004/0117478 A1 | 6/2004 | Triulzi et al. | |
| 2004/0128543 A1 | 7/2004 | Blake et al. | |
| 2004/0236874 A1 | 11/2004 | Largman et al. | |
| 2005/0022026 A1 | 1/2005 | Riordan | |
| 2005/0038827 A1 | 2/2005 | Hooks | |
| 2005/0076237 A1 | 4/2005 | Cohen et al. | |
| 2005/0120242 A1 | 6/2005 | Mayer et al. | |
| 2005/0177752 A1 | 8/2005 | Hollander et al. | |
| 2005/0182773 A1* | 8/2005 | Feinsmith | 707/100 |
| 2005/0229250 A1 | 10/2005 | Ring et al. | |
| 2005/0257266 A1 | 11/2005 | Cook et al. | |
| 2005/0268112 A1 | 12/2005 | Wang et al. | |
| 2005/0283767 A1 | 12/2005 | Blaku | |
| 2006/0015940 A1 | 1/2006 | Zamir et al. | |
| 2006/0020814 A1 | 1/2006 | Lieblich et al. | |
| 2006/0031940 A1 | 2/2006 | Rozman et al. | |

(Continued)

OTHER PUBLICATIONS

"My Registry has Over 60 errors, up from 29 errors!", groups.google.com/group/microsoft.public.windowsxp.newusers, Apr. 24, 2003.

(Continued)

*Primary Examiner*—Hosuk Song
(74) *Attorney, Agent, or Firm*—Ogilvie Law Firm

(57) ABSTRACT

Tools and techniques are provided for detecting a particular type of spyware. Network activities and user update activities are monitored automatically, and the results are analyzed to identify related processes which perform network transmissions without performing substantive user updates. These processes are identified to a user and/or an administrator as potential spyware, and are then quarantined or otherwise handled based on instructions received from the user or administrator. In some cases, the monitoring and analysis begins with selection of a group of processes to monitor, while in other cases it begins with monitoring of network and/or user update activities in order to narrow the group of suspect processes. Devices, configured media, and method products are also described.

19 Claims, 3 Drawing Sheets

U.S. PATENT DOCUMENTS

| | | | |
|---|---|---|---|
| 2006/0048225 A1 | 3/2006 | Gomez et al. | |
| 2006/0053492 A1 | 3/2006 | Wallace | |
| 2006/0117387 A1* | 6/2006 | Gunsalus et al. | 726/24 |
| 2006/0179433 A1 | 8/2006 | Fair et al. | |
| 2006/0253458 A1* | 11/2006 | Dixon et al. | 707/10 |

OTHER PUBLICATIONS

"4.1.9 script—record your screen I/O", wks.uts.ohio-state.edu, Aug. 14, 1996.

"TechSmith SCreen Recorder SDK", www.techsmith.com, copyright 1995-2006.

Pages from www.sysinternals.com, portions at least as early as Jul. 9, 1997.

"Wintasks 5 Pro Review, download Wintasks", www.clarkscript.com, no later than Mar. 14, 2006.

"Spyware Defense for SMBs", SearchSMB.com Resource Guide, no later than Mar. 23, 2006.

Pages from paretologic.com, no later than Mar. 14, 2006.

English, "Finding the Right Anti-Spyware Vendor For You", www2.darwinmag.com, Apr. 20, 2005.

"CoolWebSearch", en.wikipedia.org, Mar. 7, 2006.

Google search results "detects spyware by", www.google.com, Mar. 14, 2006.

"Finjan Announces Out-of-the-Box Anti-Spyware Gateway Appliances to Effectively Address the Global Spyware Epidemic", Jul. 18, 2005.

Pages from www.nuker.com/hunterslog, copyright 2002-2006.

"Overview: Understanding Spyware", CounterSpy help file, no later than Mar. 13, 2006.

Landesman, "Spyware Stoppers", PC World magazine, www.pcworld.com, Apr. 2005.

"Windows Defender (Beta 2) helps protect your computer from spyware and other unwanted software", www.microsoft.com, Feb. 13, 2006.

"M$ intellipoint mouse—spyware???", groups.google.com/group/alt.windows98, Dec. 29, 2002.

Brandt, "Poor Defenders", PC World magazine, www.pcworld.com, Dec. 2004.

Pages from www.softwaresecuritysolutions.com, copyright 2005.

"Cisco security agent—an enterprise solution for protection against spyware and adware", www.cisco.com, copyright 1992-2005.

Greenberg, "How to Fix Anti-Spyware", www.informationweek.com, Apr. 12, 2005.

"Spyware Profiling", Tenebril, Inc., www.tenebril.com, copyright 2005.

"Spybot Search and Destroy", "Ad-Aware SE Professional", from www.pcworld.com, no later than Mar. 24, 2006.

"Forensic Discovery", www.porcupine.org, no later than Sep. 10, 2006.

Sherri Sparks and Jamie Butler, "Shadow Walker: Raising The Bar For Windows Rootkit Detection", http://hxdef.org/knowhow/raisingbar.txt, no later than Sep. 10, 2006.

"Detecting Kernel Rootkits", linuxcourse.rutgers.edu, Jul. 15, 2004.

Bryce Cogswell and Mark Russinovich, "RootkitRevealer", www.sysinternals.com/Utilities/RootkitRevealer.html, Feb. 2, 2006.

"detect a rootkit" postings from Google Group linux.debian.security, Sep. 15, 2001.

"detect a rootkit" postings from Google Group comp.sys.mac.advocacy, Aug. 23, 2006.

Ryan Naraine, "'Shadow Walker' Pushes Envelope for Stealth Rootkits", www.eweek.com, Jul. 28, 2005.

Wang et al., "Strider Ghostbuster: Why It's A Bad Idea For Stealth Software To Hide Files", Microsoft Technical Report MSR-TR-2004-71, Jul. 24, 2004.

Mark Russinovich, "Sony, Rootkits and Digital Rights Management Gone Too Far", www.sysinternals.com/blog/2005/10/sony-rootkits-and-digital-rights.html, Oct. 31, 2005.

Chris Ries, "Inside Windows Rootkits", www.vigilantminds.com/files/inside_windows_rootkits.pdf, copyright 2006.

John G. Levine, "A Methodology for Detecting and Classifying Rootkit Exploits", Ph.D. Thesis, Georgia Institute of Technology, http://etd.gatech.edu/theses/available/etd-03172004-115855/unrestricted/john_g_levine_200405_phd.pdf, Feb. 2004.

Levine et al., "A Methodology to Characterize Kernel Level Rootkit Exploits that Overwrite the System Call Table", http://users.ece.gatech.edu/~owen/Research/Conference%20Publications/levine_secon04.pdf, 2004.

* cited by examiner

DETECTING SURREPTITIOUS SPYWARE

RELATED APPLICATIONS

This application incorporates all material in, and claims priority to, U.S. provisional patent application Ser. No. 60/724,348 filed Oct. 6, 2005.

BACKGROUND

The present invention provides tools and techniques for detecting particular types of spyware. A Google request to "define: spyware" produced the following definitions (the hyperlinks given in the definitions have been disabled and are not intended to be active, pursuant to USPTO policy in MPEP §6080.01 (VII)):

Definitions of spyware on the Web:
- Any software that covertly gathers user information through the user's Internet connection without his or her knowledge, usually for advertising purposes. Spyware applications are typically bundled as a hidden component of freeware or shareware programs that can be downloaded from the Internet. Once installed, the spyware monitors user activity on the Internet and transmits that information in the background to someone else . . . .
www dot tjiss dot net/glossary_s.html
- Software that sends information about your Web surfing habits to its Web site. Spyware is often installed without the user's knowledge or explicit permission in combination with a free download.
www dot spywaredetection dot org/spyware-glossary.htm
- Just like Adware, except that the software abuses its ability to monitor the users activity.
www dot elearners dot com/resources/advertising-glossary.asp
- gathers information about Internet users without their knowledge or consent and delivers that information to advertisers or others who have access to the information. Users can get spyware in their systems by downloading certain programs or in the form of a virus.
www dot broadbandinfo dot com/internet-connections-101/glossary/default.html
- A general term for a class of software that monitors the actions of a computer user. This software falls into a number of categories: Software that may be installed legitimately to provide security or workplace monitoring, software with relatively benign purposes that may be associated with marketing data collection and software that is maliciously installed, either as a general violation of a user's privacy or to collect information to allow further attacks on their computer or online . . . .
www dot parliament.vic.gov dot au/sarc/E-Democracy/Final_Report/Glossary.htm
- Software that monitors the activities of a user, more information . . . .
www dot cryer.co dot uk/glossary/s/
- Spyware often installs as a third-party component bundled with a freeware or shareware application, just like adware, making the distinction between the two somewhat vague. Spyware includes code used to gather and transmit information about the user or his or her behaviour to a third party. This statistical data often is collected without the knowledge or consent of the user.
www dot zdnet.co dot uk/print/
- A general term for a program that surreptitiously monitors your actions. While they are sometimes sinister, like a remote control program used by a hacker, software companies have been known to use Spyware to gather data about customers. The practice is generally frowned upon.
www dot visiontm dot com/Spy/Glossary.htm
- Spyware is a computer program which can be installed on personal computers (usually without the permission from the owner) and has the purpose of collecting information and sending it back to another source—usually an Internet marketing or pornographic website.
www dot netalert.net dot au/01990-Glossary.asp
- Any application that may track a person's or organization's online and/or offline PC activity and is capable of locally saving or transmitting those findings to third parties, most often without their knowledge or consent.
www dot targetonline dot com/sics/283069305261710.bsp
- Programs that, when installed on your computer, change settings, display advertising, and/or track Internet behavior and report information back to a central database. Spyware sometimes installed unintentionally by users along with other wanted software, and can be very hard to remove. Also known as malware.
http://www dot techlearning dot com/content/outlook/it-guy/2003/6-26.html dtp.epsb.net/glossary.htm
- A somewhat vague term generally referring to software that is secretly installed on a users computer and that monitors use of the computer in some way without the users' knowledge or consent.
www dot jahadesign dot com/glossary.htm
- is an Internet term for Advertising Supported software or Adware. It is a way for shareware/freeware software developers to make money from a software product, other than by selling it to the users. There are several large media companies that offer them to place banner ads in their products in exchange for a portion of the revenue from banner sales. This way, you don't have to pay for the software and the developers are still getting paid . . . .
www dot drdcomputer dot com/spywaredef.htm
- Installs and gathers information from a computer without permission, and reports the information to the creator of the software or to one or more third parties. It provides the consumer with little or no control over removing the software. Spyware can change system settings, install keystroke loggers, collect and report consumer's personal information, use computer processing capacity without permission, and deliver spam or ads without consumer's notice and consent.
ths dot gardenweb dot com/faq/lists/comphelp/2005011632014938.html
- Spyware is any software or program that employs a user's Internet connection in the background (the so-called "backchannel") without their knowledge or explicit permission. Silent background use of an Internet "backchannel" connection requires a complete and truthful disclosure of backchannel usage, followed by the receipt of explicit, informed consent for such use. If permission is not obtained, the act is considered to be information theft.
www dot nve.vt dot edu/cias/Resources/glossary.htm
- Installs itself onto a computer when a user clicks on a website containing spyware. The software then monitors visited websites and records habits of the user, sending it back to a main website.
www dot slais.ubc dot ca/courses/libr500/04-05-wt2/www/B_Olmstead/Glossary.htm
- Spyware is potentially more dangerous beast than Adware because it can record your keystrokes, history, passwords, and other confidential and private information. Spyware is often sold as a spouse monitor, child monitor, a surveillance tool or simply as a tool to spy on users to gain unauthorized access. Spyware is also known as: snoopware, PC surveillance, key logger, system recorders, Parental control software, PC recorder, Detective software and Internet monitoring software.

www dot geekpatroloncall dot com/spyware.html computer software that obtains information from a user's computer without the user's knowledge or consent wordnet dot princeton dot edu|perl/webwn
Spyware is a broad category of malicious software intended to intercept or take partial control of a computer's operation without the user's informed consent. While the term taken literally suggests software that surreptitiously monitors the user as a spy would, it has come to refer more broadly to software that subverts the computer's operation for the benefit of a third party.

en dot wikipedia dot org/wiki/Spyware

These definitions are helpful, but it should be noted that the term "spyware" as used herein to describe the present invention is not entirely consistent with them. For instance, the drdcomputer dot com definition treats adware and spyware as meaning the same thing, which is not consistent with the use of "spyware" herein when describing the present invention. As explained below, the present invention presumes that if some code's activity is apparent to a user, through the display of the computer the user is using, for instance, then the existence of that code can be detected without requiring the present invention. The type of spyware of greatest interest herein behaves surreptitiously, so its presence goes undetected unless the present invention (for instance) is used to detect it.

Accordingly, in connection with the prior art, "spyware" is a broad term that may include adware, browser hijackers, and other unwanted software that openly modifies a computer's output in some way not desired or intended by the user. In connection with the present invention, however, "spyware" is defined more narrowly. Unless expressly stated otherwise, "spyware" then means surreptitious spyware, e.g., spyware that monitors user activity without openly changing a machine's behavior in a manner readily apparent to the machine's user. Adware and browser hijackers are not spyware in this sense because they openly change a computer's behavior. The broad term "malware" means spyware (surreptitious or not), viruses, worms, Trojans, adware, and other unwanted software put on a computer without the user's informed consent, which inconveniences the user and/or harms user data, reputation, or other valuable resources.

Conventionally, efforts have been made to identify spyware by using tools and techniques originally developed to identify software viruses. For instance, a catalog of signatures of known viruses/spyware can be used to identify instances of such code. Signatures and other familiar spyware detection techniques are not necessarily mutually exclusive with the present invention.

Code has also been characterized as spyware based on its behavior. For instance, it has been said that "Unsolicited HTTP network activity is a telltale sign of adware and spyware, because those types of infections use HTTP connections to download and display advertisements in a browser." www dot nuker dot com slash hunterslog 22051205 dot php. Silent downloading, installation, and/or execution of code without user knowledge or consent has been viewed as a characteristic of spyware, according to Sunbelt Software's CounterSpy software documentation; see the "Overview: Understanding Spyware" document submitted with the present application. See also paretologic dot com slash resources slash detection_criteria dot aspx, and other documents submitted with the present patent application. However, a need remains for additional specific tools and techniques for detecting surreptitious spyware.

Other aspects of technology, discussed herein or previously known to those of skill in the art, may also be helpful in understanding the present invention.

SUMMARY

The present invention provides tools and techniques for detecting surreptitious spyware, namely, spyware that does not reveal its presence through browser hijacking, unwanted pop-up ads, or other unwanted actions that are readily apparent regardless of a user's technical expertise. Keylogger spyware or website visit tracking spyware, for example, may avoid such readily apparent activities so that users will be less likely to suspect the presence of unauthorized software on the system.

Some tools according to the present invention use an activities-to-code approach, that is, they watch for certain activities and then focus on code that performs/fails to perform those particular activities. One such method for identifying spyware candidates automatically monitors network transmission activities of a computer and records the identities of processes which perform network transmission, automatically monitors screen writes or other user update activities of the computer and records the identities of processes which perform user update, and automatically compares recorded identities of processes which perform network transmission with recorded identities of processes which perform user updates, to determine whether any group of one or more related processes performed at least one network transmission activity and did not perform any substantive user update activities. Some embodiments go further, by automatically grouping processes as related based on various specified criteria, and/or by identifying likely spyware and then taking steps such as notifying a user and quarantining the identified code.

In contrast with the activities-to-code approach, some tools according to the present invention use a code-by-code approach, in that they first select code and then watch the selected code to see if that code performs certain activities. One such method for identifying spyware candidates selects a group of one or more related processes, automatically monitors the selected group of processes for network transmission activities and/or for user update activities, and automatically determines whether the group of one or more related processes performed at least one network transmission activity and did not perform any substantive user update activities. This automatic monitoring can then be repeated with another code selection, so the name "code-by-code" is given to these embodiments. Some embodiments go further, by automatically identifying likely spyware and taking steps such as notifying a user and quarantining the identified code. Various criteria for selecting code to monitor are discussed.

Some embodiments combine an activities-to-code approach with a code-by-code approach. For instance, one embodiment tracks user update and network activities of all processes on a machine, selects a subset of processes for closer scrutiny based on the result of that initial tracking (e.g., by selecting all processes that did no screen updates, or all processes that did network transmission), and then monitors user update and network activities of that subset. Other claims are directed toward methods of advertising products that embody such spyware detection methods Although many of the examples given herein are methods, the invention provides generally corresponding devices, systems, configured computer-readable storage media, signals, and process products, as well as methods. The examples are merely illustrative. The present invention is defined by the claims, and to the extent this summary and/or incorporated material from a parent priority document conflicts with the claims, the claims should prevail.

DRAWINGS

To illustrate the manner in which the advantages and features of the invention are obtained, a description of the present invention is given with reference to the attached drawings. These drawings only illustrate selected aspects of the invention and thus do not fully determine the invention's scope.

DETAILED DESCRIPTION

Introduction

Figure 1:
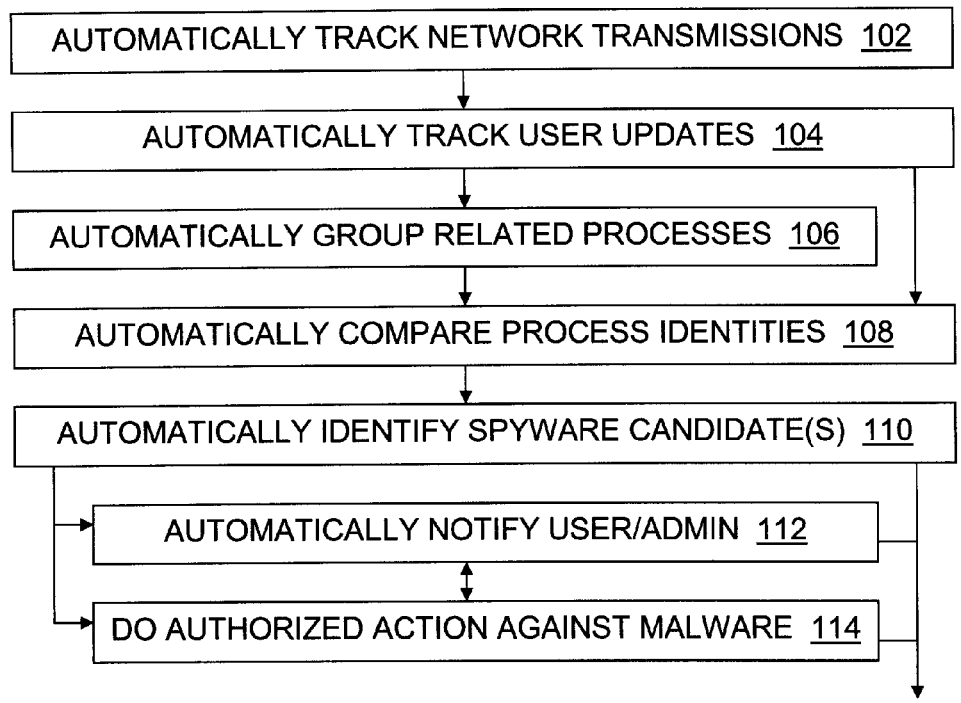
FIG. 1 is a flowchart illustrating activities-to-code methods of the present invention for identifying surreptitious spyware code candidates.

The present invention provides tools and techniques which may help reduce spyware by detecting particular types of spyware, and promoting such anti-spyware products. The invention is illustrated in text and drawings by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. Reference numerals may be used with various phrasings, to help show the breadth of a term. The inventor asserts and exercises his right to his own lexicography.

In particular, "code" may include multiple files, modules, routines, processes, threads, programs, drivers, scripts, etc., or it may be just one of these.

Overview

Some spyware tries to hide its presence from the user, while other spyware (e.g., adware, browser hijackers) does not. The present invention is directed primarily at spyware that tries to hide its presence. Some spyware reports user activity to a remote location, while other spyware does not. For instance, a particularly nasty form of spyware infects a user's computer and then urges the user to buy anti-spyware software to remove the infection. Such spyware does not necessarily report user activity to a remote location, in contrast with a keylogger, for instance. The present invention is directed primarily at spyware that at least tries to report user activity to a remote location. Thus, the present invention helps one detect a particular type of spyware by exploiting the combination of (i) the surreptitious nature of that spyware, together with (ii) the remote reporting nature of that spyware.

It is known in the art to look for spyware's presence by looking for unexpected network transmissions; see, e.g., the www dot nuker dot com slash hunterslog 22051205 dot php document submitted with the present application. No prototypes or commercial versions of the present invention are known to exist. It is expected that embodiments of the present invention will automatically monitor network transmissions, and use network activity as one aspect of detecting spyware. However, some embodiments of the present invention will go further. They will also automatically monitor updates to the user's screen, and compare those findings with network activity findings. It is believed by the inventor that some conventional keyloggers, for instance, transmit a record of user keyboard activity to a remote network location but do not write anything to the monitored user's screen because doing so would make detection of the keylogger more likely. The present invention will thus help detect such keyloggers, by finding code that sends network transmissions but never writes to the screen. Of course, legitimate programs might also perform network transmissions without any screen updates, so the present invention does not treat every such piece of code as undeniably being spyware, but rather treats it as a spyware candidate. Known spyware signatures and file names, the network location being written, the presence/absence of a digital signature on the code, and other characteristics or criteria may then be considered to help determine whether the candidate is indeed spyware.

It is possible that after software according to the invention becomes commercially available, spyware writers will try to adapt by altering their spyware so that it makes some sort of call to a screen output function. That is, surreptitious spyware could be altered, in response to the invention, to masquerade as code that is not trying to hide from users. Accordingly, some embodiments of the invention will be able to distinguish sham versions of a screen update from substantive screen updates. They will detect, for instance, sham screen update calls that merely send transparent pixels to the screen, or merely overwrite the screen with a copy of its current content at that location, or that write to a window that is not visible to the user because of its location under other window layers.

Example Scenarios

Several scenarios will now be described, but it should be kept in mind that the invention is not necessarily limited to any particular such scenario or any particular set of such scenarios. Unless otherwise indicated, these scenarios may utilize activities-to-code methods or devices, code-by-code methods or devices, or some combination of these, and they refer to embodiments consistent with one or more of the Figures.

In scenario one, a candidate process 526 transmits data over a network connection 426, is not part of the operating system, and does not update the user 404. The network connection may be to either a local network or to the Internet. Network transmissions may be detected by an embodiment of the present invention using packet sniffing, by monitoring calls to the operating system network interface, or by other means described herein or known in the art. In a variation, network transmission may include sending email, making an automated telephone call, or some other transmissions, as opposed to (or in addition to) sending packets over a computer network. Network transmissions may be tied to a particular process by checking the pid or other process ID, by tracing upward through the call/invocation tree, checking the instruction pointer, or by other means. Technology used in debuggers to determine which code was executed to reach the present point and which process owns that code may be useful in anti-spyware software 428 of the present invention, to identify the code that directly and/or indirectly causes a network transmission and to determine whether that code is part of the operating system. Legitimate operating system code may be digitally signed to distinguish it from spyware candidates. Code may update a user through a GUI, e.g., by invoking routines to draw on a screen 508 or by sending sounds through a speaker 510. Merely receiving input from a user without sending output to the user is not considered a user update; keystroke logger spyware may receive user keyboard 502 input without updating users.

Scenario two resembles scenario one, but expands to consider a group of coordinated threads, DLLs, modules, forks, or other processes 526 rather than a single process. Inventive software 428 searches for a candidate set of computing processes which—when viewed as a group—transmit over a network connection, are not part of the operating system, and do not update the user 404. A process or process set that includes no GUI is a special case of this—without a GUI it is difficult to update the user, which is fine with spyware 420 because screen activity and other user updates by a program are a clear indication of the program's presence. Another special case is code that makes no call to operating system I/O (especially Output) routines or libraries.

Scenario three may be viewed as a special case of scenario two. In scenario three, the network transmission 426 is accomplished by candidate code in part using a shared file on disk and/or a shared location in RAM 514. As used herein, disk and other non-volatile storage media 516, and RAM and other volatile media, are referred to as "device memory", "computer memory" or simply "memory" 410. One process 420 writes data to the shared memory, and the other process 420 reads that data and then transmits it over the network connection to an unauthorized destination 424. In a variation, the second process encrypts the data before transmitting the encrypted version over the network. The inventive embodiments accordingly monitor such network activities.

Scenario four relaxes the "no user update" requirement of the previous scenarios. User update in some de minimis sense occurs, but it is not substantive, and the inventive software 428 distinguishes accordingly between substantive updates (ruling code out as a candidate) and sham updates (which might be done by surreptitious spyware 420). For instance, the suspect code may do a sham update which writes only transparent pixels, or only one pixel, or only widely scattered pixels, so that the change in the image displayed on the screen 508 is likely to be missed or ignored by a user. In a variation, the suspect code writes the same (or nearly the same) data to the display 508 as is already there, e.g., by merely refreshing a window or window portion that is already fully visible. In such cases, surreptitious spyware 420 pretends to update the user 404 merely in order to appear legitimate to a version of the invention that lacks the ability to distinguish between sham and substantive screen activity, and the spyware avoids updates (or adware 416 type pop-ups or browser hijacking) that would actually reveal its presence to most users.

Scenario five drops the "not part of the operating system" requirement. Some sophisticated spyware 420 may install itself as part of the operating system, particularly on machines such as some personal computers 402 that allow operating system and user application code to use the same memory address space, or systems that allow automatic driver 522 updating. However, such spyware code may still be detected with some embodiments of the invention by noting the combination of network transmission with no substantive user update by the code. As used herein suspecting that code is spyware is a part of detecting spyware in some embodiments. That is, a definite determination that code is spyware is not necessarily required in every embodiment of the invention in every case; merely suspecting the code is enough to be considered detection.

Other aspects of the candidate code 526 may also be considered by an embodiment 428 of the invention while assessing the likelihood that the code contains spyware, as discussed below in connection with an identifying step 110.

Methods

FIG. 1 is a flowchart illustrating activities-to-code methods of the present invention. In addition to illustrating methods, this figure and the other flowcharts also help illustrate device and system embodiments, which those of skill will understand include digital devices and systems 402 configured with processors 412, other hardware 502, 504, 508, 532, and software 526, 428 to operate according to the illustrated methods, or variations thereof. Likewise, computer-readable storage media 518 such as hard drives, flash memory, RAM, CDs, DVDs, removable disks, and so on, can be configured with data and/or instructions 428 to perform the illustrated methods, and variations thereof. Variations may repeat steps, omit them, add to them, group them differently, perform them in different orders, and/or otherwise differ from the specific examples illustrated herein, provided they are still operable and conform with the claims. Indeed, reference may be made to other figures while discussing a particular figure, consistent with the fact that the figures help illustrate a variety of embodiments.

During a network activity tracking step 102, anti-spyware software 428 according to the invention automatically monitors network transmission 426 activities of a computer 402 and records the identities of processes 526 which perform those network transmission activities. Packet sniffers, transport driver interface monitors, network protocol stack enhancements, diagnostic drivers, and other tools for monitoring network activity are well known. For example, a tool called TDIMon is available through www dot sysinternals dot corn. Tools for monitoring processes and obtaining process IDs and properties are also known. For example, a tool called PMon is available through www dot sysinternals dot corn, and a tool called Wintasks 5 Pro is available through www dot clarkscript dot corn. These and other tools are discussed in documents submitted with the present application. Features of these tools could be adapted for network transmission tracking in an embodiment 428 of the present invention.

During a user update activity tracking step 104, anti-spyware software 428 according to the invention automatically monitors user update activities of a computer 402, such as writing data to a screen 508 or sending output signals to a speaker 510 (a device 402 might have both screen and speaker, or have only speakers, for instance). User update activity tracking also records the identities of processes 526 which perform those user update activities. Tools exist for recording screen output, for debugging or demo purposes, for instance. A screen recorder software development kit is available through www dot techsmith dot com, and this and other tools are discussed in documents submitted with the present application. Features of these tools could be adapted for screen activity tracking in an embodiment 428 of the present invention. It would also be possible in at least some operating systems to provide a modified screen driver 428, 522 that copies data being sent to the screen and makes it available to code 428 that obtains and records the current process ID when the screen write occurs.

Steps 102 and 104 are shown for convenience in a particular order in FIG. 1, but it will be understood that they may be performed in the opposite order, or in parallel, or partially in parallel, or in an interleaved manner or some other order. More generally, steps may be performed in an order other than that illustrated, except when the result of one step is needed as input to another step.

During a comparing step 108, anti-spyware software 428 according to the invention automatically compares recorded identities of processes which perform network transmission activities (from step 102) with recorded identities of processes which perform user update activities (from step 104), to determine whether any grouped 106 set of one or more related processes performed at least one network transmission activity and did not perform any substantive user update activities. For example, step 108 (comparing) may check entries from a list of process IDs generated during step 102 (networking) to identify those that do not appear on a list of process IDs generated during prior, subsequent, or concurrent step 104 (user updating); those identified 110 in this manner correspond to processes that had network activity without user update activity. Arrays, bitfields, trees, tables, and/or other data structures may be used to hold identify processes in a given implementation, and processes may be identified by handles, file names, pids, instruction pointers, processor number, and/or other values in a given implementation.

Comparison can be done by comparing one complete list with another complete list, but it may also be done one or a few entries at a time, even as the lists are being generated. For example, an embodiment may track 102 network transmissions until it gathers a list of ten process IDs or for one hour, whichever occurs first, and then track 104 user updates and do comparisons 108 by removing from the list each process ID on the list when/if that process performs a screen update during the next hour, or until the list is empty. Processes whose IDs remain on the list are then identified 110 as surreptitious spyware candidates because (at least during the monitoring periods) they performed network transmission and did not perform user updates.

During an optional process grouping step, processes 526 are grouped 106 together as being related, according to one or more criteria such as those discussed below. One reason to group processes is to improve the odds of catching duplicates of spyware 420 processes; spyware is known to sometimes include multiple exact or near exact copies placed on a machine under different names, for example, and viruses—another type of malware—are known to replicate themselves. Another reason to group processes is to at least reduce the risk of removing only part of a coordinated set of spyware processes, e.g., by removing a process that sends logged keyboard data to a wrongdoer 424 but failing to remove a corresponding process that gathers the keyboard data. Another reason to group processes is to reduce the risk of wrongly characterizing a process as spyware, e.g., to help identify a process that does network transmission but no screen updates as being part of a legitimate piece of software, e.g., a DLL with network transmission code which cooperates with and is intended to be a part of a networked application that does user screen updates using other code.

Processes may be automatically grouped 106 as related on the basis of criteria such as one or more of the following: a process spawned (forked, created) a related process; a process loaded a related process; a process has code residing in the same directory (folder) as code of a related process; a process has substantially the same file timestamp as a related process (e.g., within some specified tolerance such as two seconds, five minutes, three hours, or one day); a process has the same author as a related process; a process communicates with a related process (through shared memory, shared files, pipes, flags, semaphores, sockets, NetBIOS, mailslots, etc.); two related processes have substantially similar registry entries (e.g., same key and some of the same path elements, ending in same string, or ending in same string template per wildcard matching, etc.); two related processes each have a hidden file; two related processes each have a file name substantially similar to a standard operating system file name (e.g., transposed characters, one or two characters added/missing); two related processes each have a process name substantially similar to a standard operating system process name; two or more related processes reinstall one another; two related processes each interfere with user access to system information (e.g., by disabling system tools, disabling anti-malware utilities 528); two related processes each interfere with user access to anti-virus or anti-spyware information 530; two related processes each interfere with anti-virus or anti-spyware software 528.

Other grouping criteria may also be used, alone or in combination with one another or with the foregoing criteria. In some embodiments, a group of "related processes" can be a single process; if the group includes more than one process, then each pair of processes shares at least one characteristic beyond simply residing and executing on the same machine, e.g., characteristics listed previously, filename, pid, registry entries, file timestamp (within a defined tolerance), and/or same file owner/author/creator. In some embodiments, two files have "substantially the same file timestamp" if at least one of the file dates/times of one file is within a predefined tolerance of the corresponding date/time of another file, e.g., both file creation dates are within one hour of each other, or both file modification dates are within two days of each other.

As noted, an identifying step 110 automatically identifies as a spyware candidate 420 at least one group of one or more related processes 526 which performed network transmission activities and did not perform any substantive user update activities. The identifying step 110 may rely solely or primarily on the result of the comparing step 108, or it may incorporate other criteria for identifying suspicious code. Code which encrypts data prior to network transmission of the encrypted data and which provides little or no output to users may be highly suspect. Code which transmits a copy of user keystrokes and/or screen shots and provides little or no output to users may be highly suspect. Code which transmits names, postal addresses, IP addresses, URLs, credit card numbers, or data that meets the format of any of these, may be suspect, and may be highly suspect if that data was recently (or shortly thereafter is) transmitted by other code to a different location over a network. Code may be more suspect if it was installed shortly after visiting a suspect web site, e.g., one exhibiting aggressive marketing and/or explicit adult or illegal content. Code which reinstalls itself or another piece of code may be highly suspect. Software 526 which runs continuously from machine startup may be suspect, and may be highly suspect if it is both (i) not part of the operating system and (ii) does no substantive user update.

In some cases, step 110 automatically identifies a group of one or more related processes which performed network transmission activities and did not perform any user update activities whatsoever. In some cases, step 110 automatically identifies a group of one or more related processes which performed network transmission activities and did not perform any substantive user update activities; sham updates may have been done.

During a notifying step 112, the software 428 notifies a user 404, administrator, anti-spyware vendor 422, and/or other people or systems whether any code was identified 110 as suspicious, and if so, preferably provides names, locations, and other properties of the identified suspicious code. This may be accomplished by outputting the notice to a screen, file, email, pager, fax, voicemail (synthesized voice recording), and/or other communication means. Notification tools and techniques used presently in anti-virus and conventional anti-spyware tools may be adapted for use with the present invention.

During a malware-controlling step 114, the software 428 takes action against some or all of the code identified 110 as suspicious. Such action is preferably not automatic, since mis-identification may be possible, but is instead preferably done only with express authorization (e.g., button click in dialog box) by a user. Suitable actions 114 include those performed presently in anti-virus and conventional anti-spyware tools, such as quarantining and/or removing code.

Figure 2:
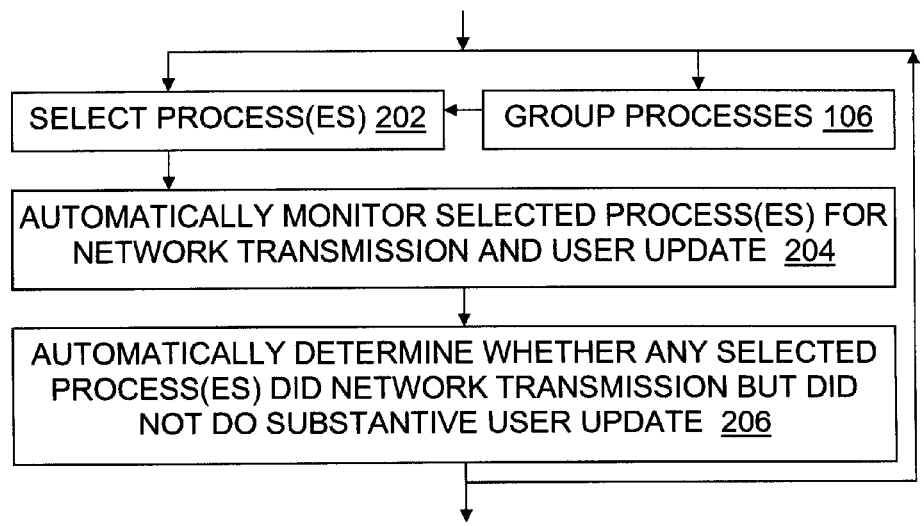
FIG. 2 is a flowchart illustrating code-by-code methods of the present invention for identifying surreptitious spyware code candidates.

FIG. 2 is a flowchart illustrating code-by-code methods of the present invention. As indicated in the flowchart, such a method may include grouping 106 related processes. During a process selecting step 202, one or more processes to monitor are selected. If processes are grouped 106, then selection of a given process may—expressly or by implication—result in selection of related processes. Selection 202 may be manual, automatic, or a combination of the two.

For example, a user may manually select a process from a list of process names; may select a process by specifying a directory, directory tree, partition, or the like which contains process code; or may select process(es) by some other interactive designation of at least one process. Code and process selection tools and techniques used presently in anti-virus and conventional anti-spyware tools may be adapted for use with the present invention.

Selection 202 may also be automated, without requiring a user to designate any process. For instance, selection may be done by defaulting to or only implementing selection of all processes, or selection of all non-operating system processes, or selection of all processes which were created or modified since the most recent execution of the inventive software 428.

Regardless of whether candidate process selection 202 is automatic, in some embodiments the selecting step favors selection of processes belonging to one or more of certain groups over processes which do not belong to any of those groups. Some potentially useful groups from which to favor selection of processes include: operating system 414 processes, recently added item (e.g., process, executable) processes 526, processes that are not digitally signed with a digital certificate from a certification authority or a particular vendor 422 of the anti-spyware product 428, processes added after a visit to a site containing adult content or illegal content, processes added after a peer-to-peer communication, processes which reinstall themselves, processes which run without being manually launched by the user, processes which monitoring 104, 204 indicates made no calls to operating system screen output routines, processes which monitoring or code disassembly/scanning indicates contain no graphical user interface calls, processes which have at least one hidden file 418, processes which are related 106 to an already selected process, processes which interfere with user access to system information 520 such as which processes are running, processes which interfere with user access to anti-malware information such as websites containing products or data designed to fight malware, processes which interfere with anti-malware software 528 such as anti-virus, anti-spyware, or anti-adware software.

During a monitoring step 204, the network transmission and user update activities of the selected processes are monitored. This may be accomplished using tools and techniques discussed in connection with steps 102, 104. Nonetheless, step 204 is numbered separately from steps 102, 104 for two reasons. First, steps 102, 104 gather, record, or otherwise note process IDs, for use in step 108; this is not necessary with step 204 because process IDs were already noted when the process (es) were selected 202. Second, step 204 monitors activity of selected processes, that is, the activity of fewer than all of the processes running on a system 402; steps 102 and 104 may, in some instances, monitor the of activity all processes.

Monitoring steps 102, 104, 204 may be accomplished in a given embodiment by doing one or more of the following: installing a hook for copying text data sent to a screen 508, installing a hook for copying pixel data sent to a screen 508, installing a hook for copying vector data sent to a screen 508, installing a hook for copying window creation data sent to a screen 508, installing a hook for copying window update data sent to a screen 508, installing a hook for copying window layering data sent to a screen 508, installing a virtual device driver 522, installing screen 508 activity monitoring code in a call chain of an operating system 414 screen I/O API, installing an interrupt handler 522 which handles at least one screen I/O interrupt, installing a peripheral filter using a VxD service 522, using screen monitoring code which shipped as part of an operating system 414, trapping writes done directly to video memory 524.

During a determining step 206, the embodiment automatically determines whether any selected process did network transmissions without doing substantive user updates, at least during the monitoring 204 period. This may be accomplished using tools and techniques discussed in connection with steps 108, 110, adapted for use on the selected 202 processes.

As indicated in the flowchart, some steps may then be repeated, so that other or additional processes 526 are possibly grouped 106, selected 202, monitored 204, and analyzed 206 to assess the risk that they include surreptitious spyware 420. Although FIG. 2 does not expressly show it, due to space limitations, code-by-code methods may also include notifying 112 and/or controlling 114 steps.

With regard to both flowcharts (FIG. 1 and FIG. 2), the tracking/monitoring steps 102, 104, 204 may be controlled manually or automatically to satisfy additional constraints. For example, in some embodiments at least one of the steps 102, 104, 204 of automatically monitoring activities of the computer 402 conforms with at least one of the following: monitoring occurs more frequently for recently added items than for older items, where an item is at least one of: a process recently created, a process having a recently added or modified file, a process having a recently added or modified registry entry; monitoring occurs more frequently for application processes than for operating system processes; monitoring occurs continuously until terminated by the user; monitoring occurs in bursts for predefined periods of time; monitoring occurs on a schedule defined by the user.

In some embodiments, particularly those which use code-by-code methods (FIG. 2) or a hybrid of the two methods (FIGS. 1 and 2), at least one of the following holds: the method rules-in code 526 as likely spyware 420 by identifying 110, 206 corresponding process groups 526 which perform at least one network transmission activity without performing any substantive user update activities during a monitoring 102, 104, 204 period; the method rules-out code 526 as unlikely spyware by identifying 110, 206 corresponding process groups 526 which do not perform any network transmission activity during a monitoring 102, 204 period; the method rules-out code 526 as unlikely spyware by identifying corresponding process groups 526 which perform substantive user update transmission activity during a monitoring 104, 204 period. This also illustrates the point made elsewhere herein that inclusion of a step in a flowchart does not necessarily require inclusion of that step in an embodiment, since decisions may be made in some cases solely on the basis of a lack of user update activity, for instance.

In some embodiments, particularly those which use activities-to-code methods (FIG. 1) or a hybrid of the two methods (FIGS. 1 and 2), at least one of the following holds: the method automatically monitors all network transmission activities of the computer over a period of time; the method automatically monitors substantially all (at least 80%) network transmission activities of the computer over a period of time; the method automatically monitors all user update activities of the computer over a period of time; the method automatically monitors substantially all (at least 80%) user update activities of the computer over a period of time; the method automatically monitors all screen update activities of the computer over a period of time; the method automatically monitors substantially all screen update activities of the computer over a period of time.

Software embodying methods of the present invention, such as methods illustrated and discussed in connection with FIGS. 1 and 2, could be operated at least in part outside a given country (e.g., the United States) yet still provide substantial benefits to users within that country. For instance, the comparison step 108 of an activities-to-code method, or the process selection step 202 of a code-by-code method, could be performed offshore. In these or other situations, it may be difficult to obtain a copy of possibly infringing software, or to disassemble or otherwise analyze that software to determine what methods it uses to identify spyware. Some software might thus infringe spyware detection method claims of this patent but unfairly avoid liability as a practical matter simply because of evidentiary costs. However, it is often possible to obtain clear and authoritative written descriptions of software even when the software itself, or an analysis of the software, is unavailable or difficult to obtain. Admissions in the form of user documentation are often available, for example. Accordingly, while many claims of the present application are directed toward particular methods of detecting spyware, other claims are directed toward methods of advertising products that embody such spyware detection methods.

Figure 3:
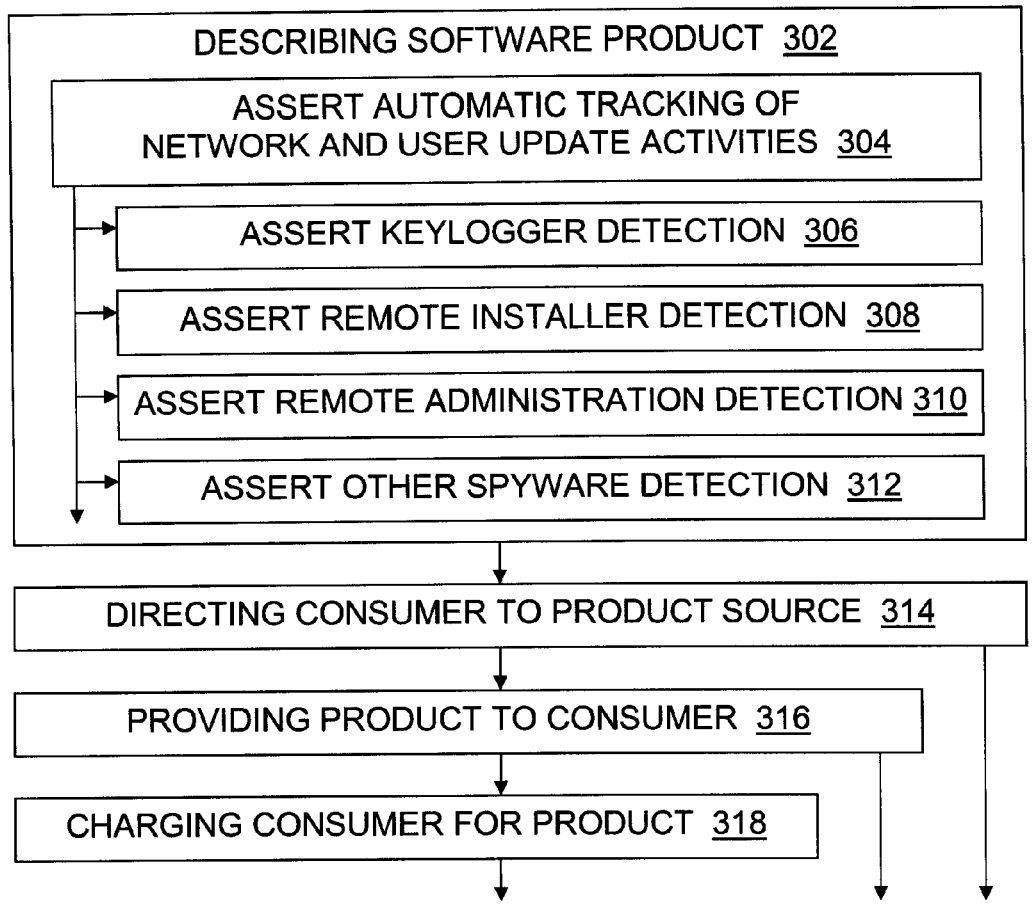
FIG. 3 is a flowchart illustrating advertising methods of the present invention for promoting products which detect surreptitious spyware code candidates.

FIG. 3 is a flowchart illustrating some product advertisement and distribution methods of the present invention. An advertiser, marketer, developer, promoter, technical writer, distributor, reseller, salesperson, product demonstrator, or similar person who benefits directly from sales and/or distribution of an anti-spyware product 428 to others, describes 302 such a product and directs 314 consumers to a source where they can obtain 316 the product, e.g., by providing a hyperlink or listing a store name. In some cases, such a person also provides 316 the product to consumers, e.g., through CD transfer or downloading, and in some but not necessarily all of those cases, they also charge 318 the consumer a monetary fee or other cost (e.g., barter) for the product. Charging 318 for the product is made optional here because distribution of a product can be harmful even if that product is distributed for free, or even if it is distributed at a loss.

Now, it is expected that some people who do not benefit directly from sales or distribution of the product 428 may also have occasion to describe the product, and may name a third party's website, store, or other product source. It is the inventor's present intention that independent reviews, news reports, and noncommercial educational papers, for instance, be able to freely describe the product and to identify sources of the product. In particular and without limitation, this patent can of course be read silently or aloud, and its figures and text can be copied, without necessarily infringing. One should be guided in this regard by principles analogous to copyright fair use, trademark fair use, and First Amendment free speech under the laws of the United States of America. However, someone who benefits directly and unfairly from sales or distribution of the product should not be able to hide behind the mantle of free speech or fair use when they are encouraging infringing activity by others. Thus, in addition to (or instead of) liability for inducing patent infringement of claims directed to methods illustrated by FIGS. 1 and 2, it is presently intended that at least some activities will also constitute direct infringement of methods illustrated by FIG. 3.

Thus, some methods of the invention include acts by a person who benefits directly from sales or distribution of a software product, namely, describing 302 the software product in terms which directly assert 304 that the product detects spyware by automatically identifying installed code which performs network transmissions without performing substantive user updates, and directing 314 a consumer to a source of the product. Other assertions may also be made in the description 302. For instance, the person may: assert 312 that the product detects spyware even when that spyware's signature has not been cataloged 530 by anti-spyware tools, assert 306 that the product detects key logger spyware, assert 312 that the product detects Trojan spyware, assert 308 that the product detects remote installer spyware, assert 312 that the product detects dialer spyware, and/or assert 310 that the product detects remote administration tool spyware.

Some methods include providing 316 to consumers an advertised software product that performs at least one of: an activities-to-code method for identifying spyware candidates, a code-by-code method for identifying spyware candidates. This may be done, e.g., by allowing consumers to download the product or by sending them CDs configured by the product.

The person who benefits directly from sales or distribution of the anti-spyware product may be an individual, or a legal person such as a corporation, limited liability company, or partnership, or it may be an agency, institution, collective, club, cooperative, association, council, or the like. The description may be textual, graphical, animated, in web pages, printed materials, multimedia, and/or other media. As used herein, "terms which directly assert" means the assertion is not merely implied; it may directly assert while still using different terminology or paraphrasing the language used here, provided it conveys the key concept(s) of whatever must be asserted.

Devices and Systems

Figure 4:
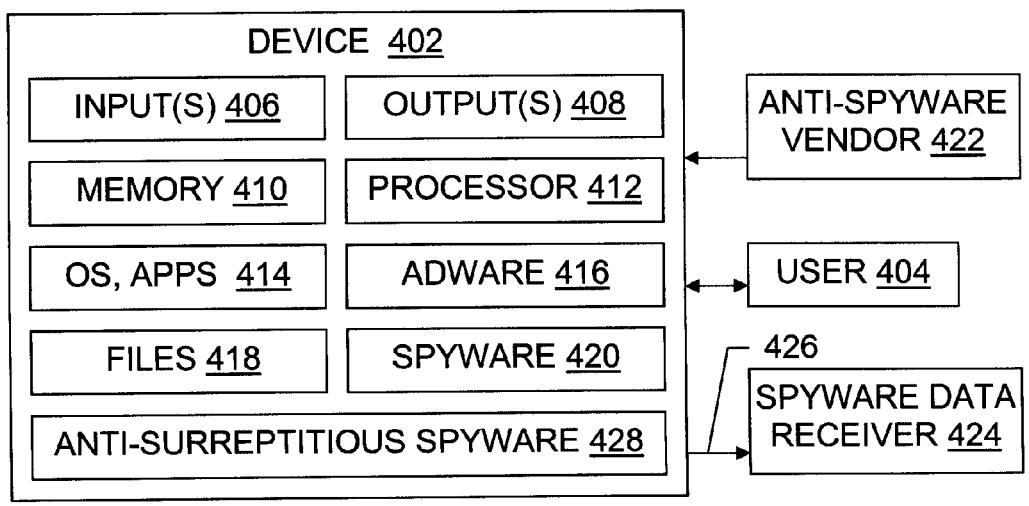
FIG. 4 is a block diagram illustrating a device, a user, and various interactions, in a configuration employing the present invention.
Figure 5:
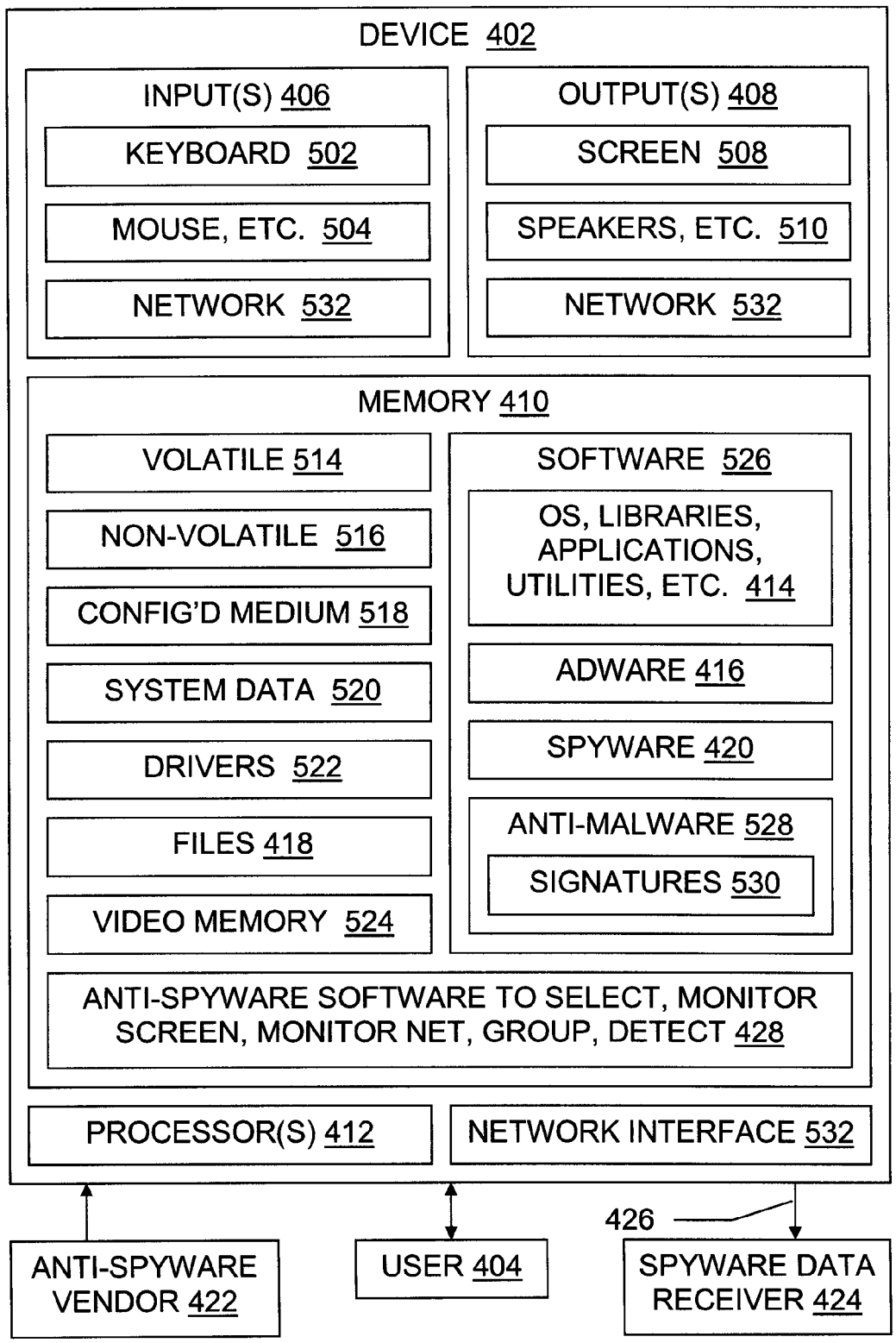
FIG. 5 is a block diagram further illustrating the device of FIG. 4.

FIGS. 4 and 5 are diagrams illustrating devices and systems, users and other people or businesses, and various interactions, in a configuration employing the present invention. Not every illustrated component need be present in every embodiment. An individual device 402 is shown, but it will be understood that systems according to the invention are also being illustrated and explained, as they may contain the same or similar components having the same or similar functionality.

The illustrated user device 402 has inputs 406 and outputs 408. In general, surreptitious spyware 420 (a) uses an output, such as a network connection 532 to a remote site 424, that is not easily detected by the user 404, (b) avoids using outputs, such as the screen 508, speakers 510, printer 510, etc., which are easily detected by the user, and (c) makes unauthorized use of either data 520, 418 that has already been input or of data that is being input by the user through a keyboard 502, mouse tracking 504, etc. This set of characteristics distinguishes surreptitious spyware 420 from other types of malware, such as adware 416, openly damaging viruses, and browser hijackers, which may do (a), sometimes do (c), but do not do (b).

The device 402 has a display 508, optional mouse 504, keyboard 502, or similar input peripheral(s), at least one digital processor 412, and a network card/radio or cell phone transceiver/or the like 532. Data of various types (such as contacts, cookies, web pages, operating system and application software 414, and files 418) is stored in RAM 514, disk 516, SIM card 516, and/or other computer-readable memory 410. User devices 402 are not necessarily all computers; cell phones 402, personal digital assistants 402, and other devices 402 can also be protected from spyware 420 according to the present invention.

Process Products

An advertisement for anti-surreptitious spyware can be produced using a process that includes steps 302 and 314. Also, a copy of an anti-surreptitious spyware product 428 may be produced by a process that includes steps 302, 314, and 316. A list of suspect software code 526 may be produced by an activities-to-code process using steps shown in FIG. 1 and/or by a code-by-code process using steps shown in FIG. 2. In each of these cases, the invention provides a novel process product, which to reduce confusion may also be called a method product, since "process" is a term used both in patent law and in computer science.

Configured Media

Computer-readable storage media 518 such as hard drives, flash memory, RAM, CDs, DVDs, removable disks, and so on, can be configured with data and/or instructions 428 to perform the illustrated methods, and variations thereof. For example, one embodiment includes a non-volatile medium 516 configured by a software product which performs at least one of: an activities-to-code method, a code-by-code method.

The activities-to-code method if present includes automatically monitoring 102 network transmission activities of a computer 402 and recording 102 the identities of processes 526 which perform said network transmission activities; automatically monitoring 104 user update activities of the computer and recording 104 the identities of processes which perform said user update activities; and automatically comparing 108 recorded identities of processes which perform network transmission activities with recorded identities of processes which perform user update activities, to determine whether any group of one or more related processes performed at least one network transmission activity and did not perform any substantive user update activities.

The code-by-code method if present in the configured medium includes selecting 202 a group of one or more related processes 526; automatically monitoring 204 the selected group of processes for network transmission activities and/or for user update activities; and automatically determining whether the group of one or more related processes is likely spyware based at least in part on a result of the monitoring step.

One such configured medium further automatically identifies 110 as a spyware candidate at least one group of one or more related processes which performed network transmission activities and did not perform any substantive user update activities, regardless of whether steps 102, 104 were performed (step 204 may have been performed, or steps 102, 204, 204 may have been performed). One such configured medium automatically monitors 104, 204 user update activities in the form of screen 508 updates. Some configured media when executed automatically group 106 processes as related, on the basis of any one or more criteria noted herein. Some notify 112 users and/or administrators; some take action 114 against some or all of the identified spyware candidates.

CONCLUSION

Some embodiments of the invention compare surreptitious and non-surreptitious behaviors of various code sets 526 and then assess the level of likelihood that spyware 420 is present based on the observed/likely/possible behaviors. In these embodiments, a combination of remote reporting 426 and lack of open behavior using the outputs 508, 510 in a piece of code make it more likely the code will be reported 112 to the user as spyware or otherwise treated 114 as spyware.

The invention may be embodied in various ways, e.g., processes on a server computer, processes on a client or peer computer, software (data instructions) in RAM or permanent storage for performing a process, a computer configured by software, data produced by a method, and so on. Computers, personal digital assistants, cell phones, and any other device 402 having user interface and network transmission capabilities may be assisted by a suitable embodiment 428 to detect spyware 420 on the device(s).

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. It does not follow that limitations from one embodiment are necessarily read into another.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools such as C++, C, Java, scripting languages, HTML, XML, APIs, SDKs, network protocol stacks, assembly language, firmware, microcode, compilers, debuggers, packet sniffers, and/or other languages and tools.

Although this document includes website addresses, the addresses and the material on the sites addressed by the stated addresses are provided only for background and/or as examples to help illustrate the invention. The document does not incorporate by reference any essential material from those websites or other sources.

The embodiments discussed are illustrative of the application for the principles of the present invention. Numerous modifications and alternative embodiments can be devised without departing from the spirit and scope of the present invention.

I claim:

1. An activities-to-code method for identifying spyware candidates, comprising:

automatically monitoring network transmission activities of a computer and recording the identities of processes which perform said network transmission activities;

automatically monitoring user update activities of the computer, namely, activities that write to a screen of the computer and/or send output to a speaker of the computer, and recording the identities of processes which are not surreptitious because they indicate their presence to a user of the computer by performing said user update activities;

identifying at least one spyware candidate by automatically comparing recorded identities of processes which perform network transmission activities with recorded identities of processes which perform user update activities, to determine whether any group of one or more related processes performed at least one network transmission activity and did not perform any substantive user update activities; and automatically identifying as a spyware candidate at least one group of one or more related processes which performed network transmission activities and did not perform any substantive user update activities;

wherein the method automatically identifies a group of one or more related processes which performed network transmission activities and did not perform any user update activities.

2. The activities-to-code method of claim 1, further comprising automatically grouping processes as related on the basis of at least one of the following:

two related processes each have a hidden file;

two or more related processes reinstall one another;

two related processes each interfere with user access to system information;

two related processes each interfere with user access to anti-virus or anti-spyware information;

two related processes each interfere with anti-virus or anti-spyware software.

3. The activities-to-code method of claim 2, wherein the method automatically groups processes as related on the basis of at least three of the following:

a process spawned a related process;

a process loaded a related process;

a process has code residing in the same directory as code of a related process;

a process has substantially the same file timestamp as a related process;

a process has the same author as a related process;

a process communicates with a related process;

two related processes have substantially similar registry entries;

two related processes each have a hidden file;

two related processes each have a file name substantially similar to a standard operating system file name;

two related processes each have a process name substantially similar to a standard operating system process name;

two or more related processes reinstall one another;

two related processes each interfere with user access to system information;

two related processes each interfere with user access to anti-virus or anti-spyware information;

two related processes each interfere with anti-virus or anti-spyware software.

4. The activities-to-code method of claim 1, wherein at least one of the steps of automatically monitoring activities of the computer conforms with at least one of the following:

monitoring occurs more frequently for recently added items than for older items, where an item is at least one of: a process recently created, a process having a recently added or modified file, a process having a recently added or modified registry entry;

monitoring occurs more frequently for application processes than for operating system processes;

monitoring occurs continuously until terminated by the user;

monitoring occurs in bursts for predefined periods of time;

monitoring occurs on a schedule defined by the user.

5. The activities-to-code method of claim 1, wherein at least one of the following holds:

the method automatically monitors all network transmission activities of the computer over a period of time;

the method automatically monitors substantially all network transmission activities of the computer over a period of time;

the method automatically monitors all user update activities of the computer over a period of time;

the method automatically monitors substantially all user update activities of the computer over a period of time;

the method automatically monitors all screen update activities of the computer over a period of time;

the method automatically monitors substantially all screen update activities of the computer over a period of time.

6. A code-by-code method for identifying spyware candidates, comprising:

selecting a group of one or more related processes;

automatically monitoring the selected group of processes for network transmission activities and for user update activities which indicate a process's presence to a user, namely, activities that write to a screen of a device and/or send output to a speaker of the device; and identifying at least one spyware candidate by automatically determining whether the group of one or more related processes performed at least one network transmission activity and did not perform any substantive user update activities;

wherein the method repeats at least once, by selecting another group of one or more related processes, automatically monitoring that group, and automatically determining whether that group performed at least one network transmission activity and did not perform any substantive user update activities.

7. The code-by-code method of claim 6, wherein the method conforms with at least one of the following:

the method rules-in code as likely spyware by identifying corresponding process groups which perform at least one network transmission activity without performing any substantive user update activities during a monitoring period;

the method rules-out code as unlikely spyware by identifying corresponding process groups which do not perform any network transmission activity during a monitoring period;

the method rules-out code as unlikely spyware by identifying corresponding process groups which perform substantive user update transmission activity during a monitoring period.

8. The code-by-code method of claim 6, wherein the step of selecting a group of one or more related processes selects processes in response to an interactive designation of at least one process of the group by a user.

9. The code-by-code method of claim 6, wherein the step of selecting a group of one or more related processes selects processes automatically without requiring a user to designate any process of the group.

10. The code-by-code method of claim 6, wherein the selecting step favors selection of a process belonging to at least one of the following groups over processes which do not belong to said group(s), and does so for each of at least four processes and a respective at least four of said groups:
   operating system processes;
   recently added item processes;
   processes that are not digitally signed;
   processes added after a visit to a site containing adult content;
   processes added after a peer-to-peer communication;
   processes which reinstall themselves;
   processes which run without being manually launched by a user;
   processes which make no calls to operating system screen output routines;
   processes which contain no graphical user interface calls;
   processes which have at least one hidden file;
   processes which are related to an already selected process;
   processes which interfere with user access to system information;
   processes which interfere with user access to anti-malware information;
   processes which interfere with anti-malware software.

11. A computer-readable medium configured by code for performing an anti-spyware method comprising at least one of: an activities-to-code method, a code-by-code method,
   wherein the activities-to-code method if present includes:
      automatically monitoring network transmission activities of a computer and recording the identities of processes which perform said network transmission activities;
      automatically monitoring user update activities of the computer which indicate a process's presence to a user, namely, activities that write to a screen of the computer and/or send output to a speaker of the computer and recording the identities of processes which perform said user update activities; and
      automatically comparing recorded identities of processes which perform network transmission activities with recorded identities of processes which perform user update activities, to determine whether any group of one or more related processes performed at least one network transmission activity and did not perform any substantive user update activities;
   and wherein the code-by-code method if present includes:
      selecting a group of one or more related processes;
      automatically monitoring the selected group of processes for network transmission activities and/or for user update activities which indicate a process's presence to the user, namely, activities that write to the screen of the computer and/or send output to the speaker of the computer; and
      automatically determining whether the group of one or more related processes is likely spyware based at least in part on a result of the monitoring step.

12. The configured medium of claim 11, wherein a method present further comprises automatically identifying as a spyware candidate at least one group of one or more related processes which performed network transmission activities and did not perform any substantive user update activities.

13. The configured medium of claim 11, wherein the method present automatically monitors user update activities in the form of screen updates.

14. The configured medium of claim 11, wherein the method present automatically groups processes as related on the basis of at least one of the following:
   a process spawned a related process;
   a process loaded a related process;
   a process has code residing in the same directory as code of a related process;
   a process has substantially the same file timestamp as a related process;
   a process has the same author as a related process;
   a process communicates with a related process;
   two related processes have substantially similar registry entries;
   two related processes each have a hidden file;
   two related processes each have a file name substantially similar to a standard operating system file name;
   two related processes each have a process name substantially similar to a standard operating system process name;
   two or more related processes reinstall one another;
   two related processes each interfere with user access to system information;
   two related processes each interfere with user access to anti-virus or anti-spyware information;
   two related processes each interfere with anti-virus or anti-spyware software.

15. The configured medium of claim 11, wherein the method present determines that a group of one or more related processes performed at least one network transmission activity and did not perform any substantive user update activities, and the method further comprises at least one of the following:
   notifying a user that the group of processes is a spyware candidate;
   notifying an administrator that the group of processes is a spyware candidate;
   notifying a user that the group of processes is spyware;
   notifying an administrator that the group of processes is spyware;
   quarantining the group of processes and/or its code;
   disabling the group of processes and/or its code from executing on the computer;
   removing the group of processes and/or its code from the computer.

16. The configured medium of claim 11, wherein the method present further comprises monitoring user update activity automatically by at least one of:
   installing a hook for copying text data sent to a screen;
   installing a hook for copying pixel data sent to a screen;
   installing a hook for copying vector data sent to a screen;
   installing a hook for copying window creation data sent to a screen;
   installing a hook for copying window update data sent to a screen;
   installing a hook for copying window layering data sent to a screen;
   installing a virtual device driver;
   installing screen activity monitoring code in a call chain of an operating system screen I/O API;
   installing an interrupt handler which handles at least one screen I/O interrupt;
   installing a peripheral filter using a VxD service;

using screen monitoring code which shipped as part of an operating system;

trapping writes done directly to video memory.

17. A list identifying at least one suspect software code, the list produced by an anti-spyware method comprising at least one of: activities-to-code method steps, code-by-code method steps, wherein the activities-to-code method steps if present include:

automatically monitoring network transmission activities of a computer and recording the identities of processes which perform said network transmission activities;

automatically monitoring user update activities of the computer which indicate a process's presence to a user, namely, activities that write to a screen of the computer and/or send output to a speaker of the computer and recording the identities of processes which perform said user update activities; and automatically comparing recorded identities of processes which perform network transmission activities with recorded identities of processes which perform user update activities, to determine whether any group of one or more related processes performed at least one network transmission activity and did not perform any substantive user update activities;

and wherein the code-by-code method steps if present include:

selecting a group of one or more related processes;

automatically monitoring the selected group of processes for network transmission activities and/or for user update activities which indicate a process's presence to the user, namely, activities that write to the screen of the computer and/or send output to the speaker of the computer; and automatically determining whether the group of one or more related processes is likely spyware based at least in part on a result of the monitoring step.

18. The list of claim 17, wherein the list identifies at least two codes which jointly or severally fall into at least two of the following groups:

recently added item processes;
processes that are not digitally signed;
processes added after a visit to a site containing adult content;
processes added after a peer-to-peer communication;
processes which reinstall themselves;
processes which run without being manually launched by a user;
processes which have at least one hidden file;
processes which interfere with user access to system information;
processes which interfere with user access to anti-malware information;
processes which interfere with anti-malware software.

19. An activities-to-code method for identifying spyware candidates, comprising:

automatically monitoring network transmission activities of a computer and recording the identities of processes which perform said network transmission activities;

automatically monitoring user update activities of the computer, namely, activities that write to a screen of the computer and/or send output to a speaker of the computer, and recording the identities of processes which are not surreptitious because they indicate their presence to a user of the computer by performing said user update activities;

identifying at least one spyware candidate by automatically comparing recorded identities of processes which perform network transmission activities with recorded identities of processes which perform user update activities, to determine whether any group of one or more related processes performed at least one network transmission activity and did not perform any substantive user update activities;

automatically grouping processes as related on the basis of at least one of the following:

two related processes each have a hidden file;
two or more related processes reinstall one another;
two related processes each interfere with user access to system information;
two related processes each interfere with user access to anti-virus or anti-spyware information;
two related processes each interfere with anti-virus or anti-spyware software;

and automatically grouping processes as related on the basis of at least three of the following:

a process spawned a related process;
a process loaded a related process;
a process has code residing in the same directory as code of a related process;
a process has substantially the same file timestamp as a related process;
a process has the same author as a related process;
a process communicates with a related process;
two related processes have substantially similar registry entries;
two related processes each have a hidden file;
two related processes each have a file name substantially similar to a standard operating system file name;
two related processes each have a process name substantially similar to a standard operating system process name;
two or more related processes reinstall one another;
two related processes each interfere with user access to system information;
two related processes each interfere with user access to anti-virus or anti-spyware information;
two related processes each interfere with anti-virus or anti-spyware software.

* * * * *